(12) United States Patent
Cha et al.

(10) Patent No.: US 12,292,666 B2
(45) Date of Patent: May 6, 2025

(54) COLOR-CHANGEABLE PLASTIC

(71) Applicants:HYUNDAI MOTOR COMPANY, Seoul (KR); KIA CORPORATION, Seoul (KR); Pusan National University Industry-University Cooperation Foundation, Busan (KR)

(72) Inventors: Dong Eun Cha, Hwaseong-si (KR); Hyun Kyung Kim, Hwaseong-si (KR); Jong Seung Park, Busan (KR); Jun Hong Choi, Busan (KR)

(73) Assignees: Hyundai Motor Company, Seoul (KR); Kia Corporation, Seoul (KR); Pusan National University Industry-University Cooperation Foundation, Busan (KR)

( * ) Notice: Subject to any disclaimer, the term of this patent is extended or adjusted under 35 U.S.C. 154(b) by 984 days.

(21) Appl. No.: 17/341,922

(22) Filed: Jun. 8, 2021

(65) Prior Publication Data

US 2022/0137473 A1    May 5, 2022

(30) Foreign Application Priority Data

Nov. 3, 2020  (KR) .......................... 10-2020-0145398

(51) Int. Cl.
*G02F 1/1516*  (2019.01)
*C08F 12/30*  (2006.01)
(Continued)

(52) U.S. Cl.
CPC .......... *G02F 1/15165* (2019.01); *C08F 12/30* (2013.01); *C08K 3/08* (2013.01);
(Continued)

(58) Field of Classification Search
CPC ................. G02F 1/15165; G02F 1/155; G02F 2201/122; G02F 2202/022; G02F 2202/36;
(Continued)

(56) References Cited

U.S. PATENT DOCUMENTS 4,174,152 A * 11/1979 Giglia ................... G02F 1/1525
359/275
4,645,308 A    2/1987  Tracy et al.
(Continued)

FOREIGN PATENT DOCUMENTS

JP       2020-509434 A     3/2020
KR    10-2004-0031685 A   4/2004
(Continued)

OTHER PUBLICATIONS

Office Action issued Oct. 17, 2022 in U.S. Appl. No. 17/240,423.
(Continued)

*Primary Examiner* — Balram T Parbadia
*Assistant Examiner* — Gabriel A Sanz
(74) *Attorney, Agent, or Firm* — Fox Rothschild LLP (57) ABSTRACT

A form of a color-changeable plastic includes: a first conductive electrode layer; a color change layer disposed on the first conductive electrode layer, configured to cover a top surface of the first conductive electrode layer, and made of a substance that changes color depending on whether a voltage is applied; a second conductive electrode layer disposed on the color change layer, configured to cover a top surface and side surfaces of the color change layer, and configured to change the color of the color change layer with the first conductive electrode layer when the voltage is applied; and a conductive guide disposed at at least one of the first conductive electrode layer or the second conductive electrode layer, and configured to guide a movement of
(Continued)

electrons and a color change direction of the color change layer when the voltage is applied.

8 Claims, 9 Drawing Sheets

(51) Int. Cl.
    *C08K 3/08*     (2006.01)
    *C08K 7/06*     (2006.01)
    *G02B 1/116*     (2015.01)
    *G02F 1/155*     (2006.01)

(52) U.S. Cl.
CPC ............... *C08K 7/06* (2013.01); *G02B 1/116* (2013.01); *G02F 1/155* (2013.01); *C08K 2003/0806* (2013.01); *C08K 2201/001* (2013.01); *C08K 2201/011* (2013.01); *G02F 2201/122* (2013.01); *G02F 2202/022* (2013.01); *G02F 2202/36* (2013.01)

(58) Field of Classification Search
CPC ........ G02F 1/1516; G02F 1/153; G02F 1/163; C08F 12/30; C08K 3/08; C08K 7/06; C08K 2003/0806; C08K 2201/001; C08K 2201/011; G02B 1/116; G01N 31/22; C09D 125/18

See application file for complete search history.

(56) References Cited

U.S. PATENT DOCUMENTS

| | | | |
|---|---|---|---|
| 4,902,108 | A | 2/1990 | Byker |
| 5,187,607 | A | 2/1993 | Endo et al. |
| 10,386,688 | B1* | 8/2019 | Sharpe ...................... E06B 9/24 |
| 2002/0000558 | A1* | 1/2002 | Morimoto ............. H01L 33/387 |
| | | | 257/79 |
| 2004/0042059 | A1 | 3/2004 | Minami et al. |
| 2007/0188845 | A1* | 8/2007 | Xu ....................... C08G 61/126 |
| | | | 359/273 |
| 2008/0128286 | A1 | 6/2008 | Wu et al. |
| 2009/0211640 | A1 | 8/2009 | Lee et al. |
| 2011/0272176 | A1* | 11/2011 | Goto ...................... B82Y 10/00 |
| | | | 977/932 |
| 2014/0354140 | A1* | 12/2014 | Schmidt ............... C09K 11/565 |
| | | | 252/301.36 |
| 2015/0362819 | A1* | 12/2015 | Bjornard ................. G02F 1/163 |
| | | | 427/523 |
| 2015/0378234 | A1 | 12/2015 | Konkin et al. |
| 2017/0176831 | A1 | 6/2017 | Dixit et al. |
| 2017/0235203 | A1 | 8/2017 | Yamamoto et al. |
| 2017/0357136 | A1 | 12/2017 | Kloeppner et al. |
| 2018/0346421 | A1 | 12/2018 | Lin et al. |
| 2019/0041712 | A1* | 2/2019 | Liu ........................ G02F 1/1525 |
| 2019/0086757 | A1 | 3/2019 | Mei et al. |
| 2020/0192171 | A1 | 6/2020 | Higuchi et al. |
| 2022/0003038 | A1* | 1/2022 | Chen ....................... G02F 1/163 |

FOREIGN PATENT DOCUMENTS

| | | |
|---|---|---|
| KR | 10-2007-0009682 A | 1/2007 |
| KR | 10-2019-0057436 | 5/2019 |
| TW | 201544886 A | 12/2015 |

OTHER PUBLICATIONS

G.K. Pande et al., "Octa-viologen sugstituted polyhedral oligomeric silsesquioxane exhibiting outstanding electrochromic performances", Chemical ENgineering Journal, 393, pp. 1-9 (2020).
Y.J. Noh et al., "Cost-effective ITO-free organic solar cells with silver nanowire—PEDOT:PSS composite electrodes via a one-step spray deposition method", Solar Energy Materials & Solar Cells, 120, pp. 226-230 (2014).
Office Action issued on Apr. 14, 2023 in U.S. Appl. No. 17/240,423.
S.T. Hsu et al., "Free-standing polymer electrolyte for all-solid-state lithium batteries operated at room temperature", Journal of Power Sources, vol. 449, pp. 1-9 (2020).
Office Action issued Jun. 14, 2024 in Chinese Application No. 202110521113.6.
G. Shangkai et al., "Brain-computer interaction reserach frontier", Frontiers of Brain-Computer Interaction Research, Dec. 31, 2019, pp. 439-440.
W. Yuanchang et al., "The Age of Arificial Intelligence: A Study on the Design and Manufacture of Electronic Products", Jan. 31, 2019, pp. 145-146.
Z. Minglong et al., "An Overview of Innovations in Materials in the U.S.", May 31, 2016, p. 256.
Office Action issued Aug. 19, 2024 in Korean Patent Application No. 10-2020-0119240.
Office Action issued Nov. 21, 2024 in corresponding Korean Patent Application No. 10-2020-0145398.

* cited by examiner

COLOR-CHANGEABLE PLASTIC

CROSS-REFERENCE TO THE RELATED APPLICATION

This application claims priority to and the benefit of Korean Patent Application No. 10-2020-0145398, filed on Nov. 3, 2020, the entire contents of which are incorporated herein by reference.

FIELD

The present disclosure relates to a color-changeable plastic that changes color depending on whether a voltage is applied.

BACKGROUND

The statements in this section merely provide background information related to the present disclosure and may not constitute prior art.

Recently, color marketing has been highlighted in various fields (for example, home appliances and mobile devices). Particularly, color marketing has also been attracting attention in automobile industries in order to provide high-class and differentiated colors.

Accordingly, electrochromism is used in an attempt to provide high-class color images. Electrochromism refers to a process in which a reversible color change occurs when an electrode material undergoes oxidation or reduction reaction electrochemically. The principle of electrochromism is as follows: if Li+ or H+ and electrons are injected into WO3, which is a typical reduction coloring material, the WO3 undergoes electrochromism and is colored. The WO3 becomes transparent if Li+ or H+and electrons are discharged therefrom. If Li+ or H+ and electrons are discharged from an oxidation coloring material (for example, MnO or LiO), the oxidation coloring material is colored, and the same becomes transparent if Li+ or H+ and electrons injected therein. That is, a conventional lamination structure includes a glass substrate, a transparent electrode, a reduction coloring material (WO3), an electrolyte (Li+, H+), an oxidation coloring material (NiO), another transparent electrode, and another glass substrate, which are sealed to form an electrochromism element.

We have discovered that to such a conventional electrochromism element, it is difficult to apply various substrate materials. Furthermore, the low electrochromism speed thereof causes extraneous look during a color change.

The above descriptions regarding background arts are only for helping understanding of the background of the present disclosure, and are not to be considered by a person skilled in the art as corresponding to already-known prior arts.

SUMMARY

The present disclosure provides a color-changeable plastic having an improved color change speed when a voltage is applied.

A color-changeable plastic according to the present disclosure may include: a first conductive electrode; a color change layer disposed on the first conductive electrode layer, configured to cover a top surface of the first conductive electrode layer, and made of a substance that changes color depending on whether a voltage is applied; a second conductive electrode layer, disposed on the color change layer, configured to cover a top surface and side surfaces of the color change layer, and configured to change the color of the color change layer with the first electrode layer when the voltage is applied; and a conductive guide, disposed at at least one of the first conductive electrode layer or the second conductive electrode layer, and configured to guide a movement of electrons and a color change direction of the color change layer when the voltage is applied.

The first electrode layer and the second electrode layer may be composites of a silver nanowire and a polystyrene sulfonate.

The composites of the first electrode layer and the second electrode layer may include divinyl sulfone (DVS) as a crosslink agent.

The guide may be a silver (Ag) lattice having a narrow linewidth of 15 to 300 μm.

The guide may have an edge portion surrounding edges of the first electrode layer or the second electrode layer, and a guide pattern portion having a pattern inside the edge portion and configured to guide a color change direction of the color change layer.

The guide pattern portion may extend to straightly cross an inside of the edge portion.

A plurality of guide pattern portions may be provided and spaced apart from each other.

The guide pattern portion may have first guide lines straightly crossing straight the inside of the edge portion and second guide lines straightly crossing the inside of the edge portion perpendicularly to the first guide lines, whereby a lattice pattern is formed.

The guide pattern portion may have a plurality of first guide lines spaced apart from each other and gradually increasing in length, and the second guide lines may extend to respectively connect the first guide lines, whereby the lattice pattern gradually increases.

The edge portion may be formed in a circular shape, and the guide pattern portion may include: guide rings radially arranged at predetermined intervals from a center of the edge portion; and a plurality of connection lines connecting sequentially and gradually more guide rings in a circumferential direction from the edge portion, wherein each connection line of the plurality of connection lines is spaced apart from each other in the circumferential direction of the edge portion and extends toward the center of the edge portion.

The color-changeable plastic having the above-mentioned structure is advantageous in that the color change speed is improved when a voltage is applied, and the color change direction thereof can be set.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

A color-changeable plastic according to exemplary forms of the present disclosure is described hereafter with reference to the accompanying drawings.

Figure 1:
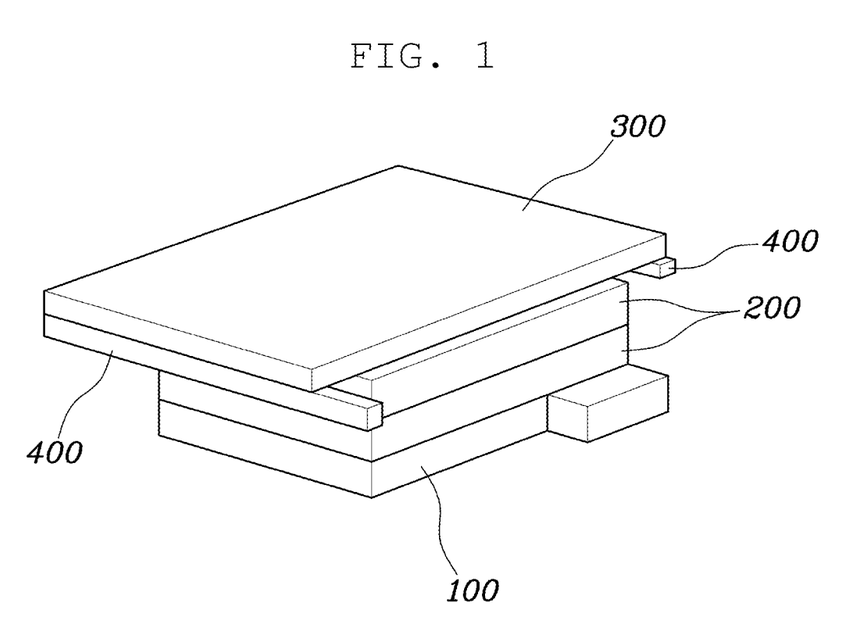
FIGS. 1 and 2 are views showing a color-changeable plastic according to the present disclosure.
Figure 2:
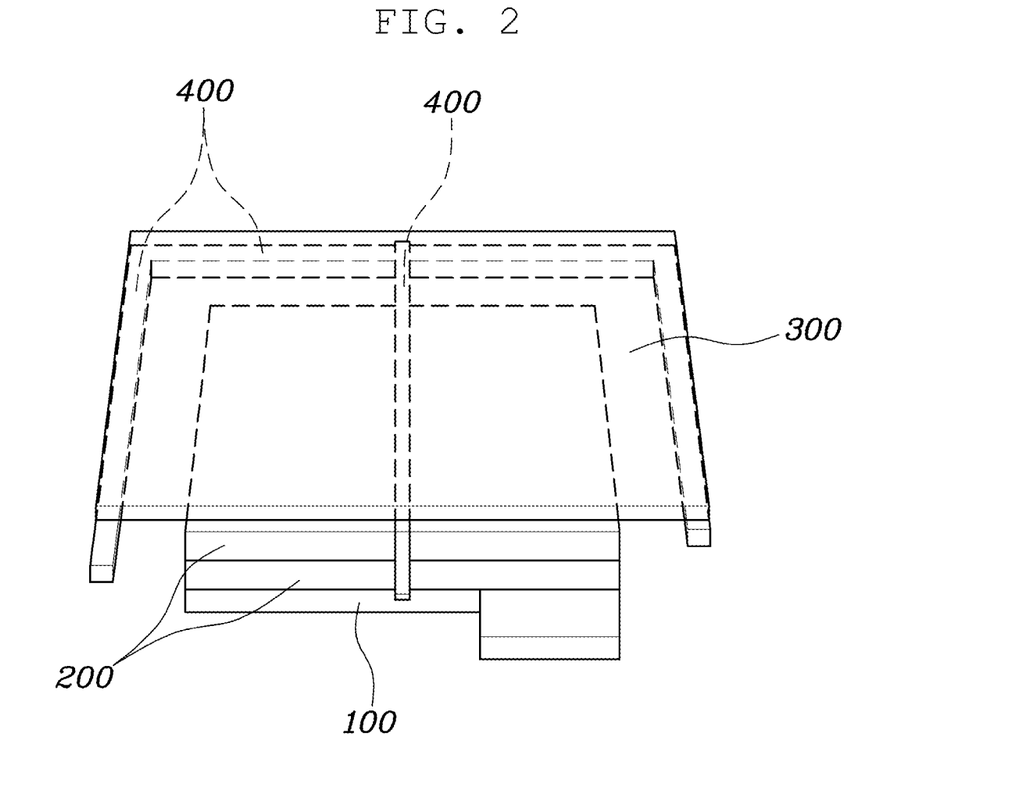
Figure 3:
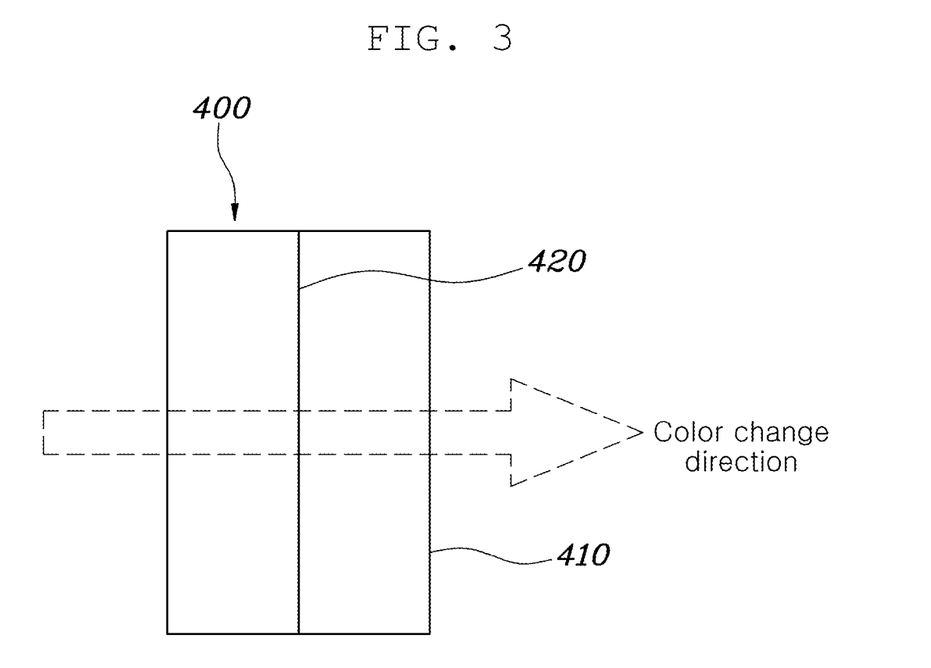
FIG. 3 is a view showing one form of a guide of the color-changeable plastic.
Figure 4:
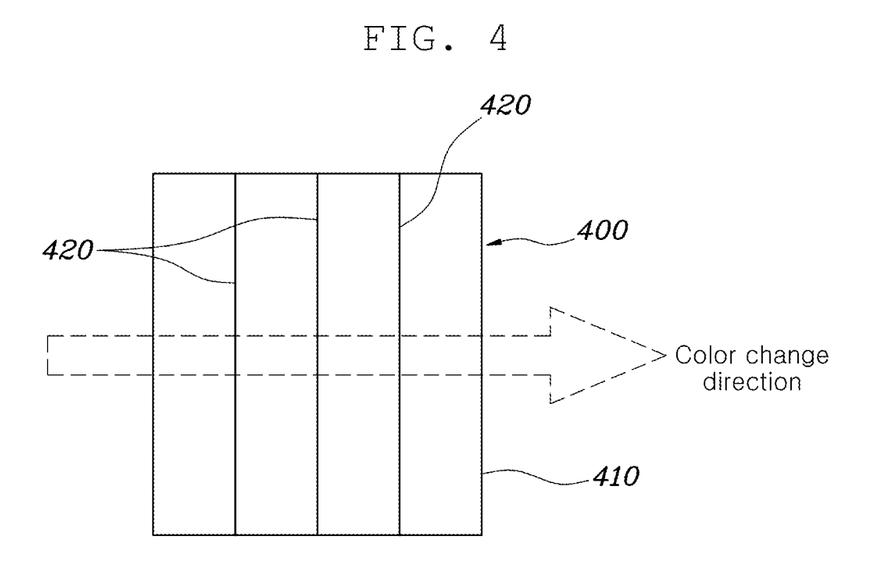
FIG. 4 is a view showing another form of the guide of the color-changeable plastic.
Figure 5:
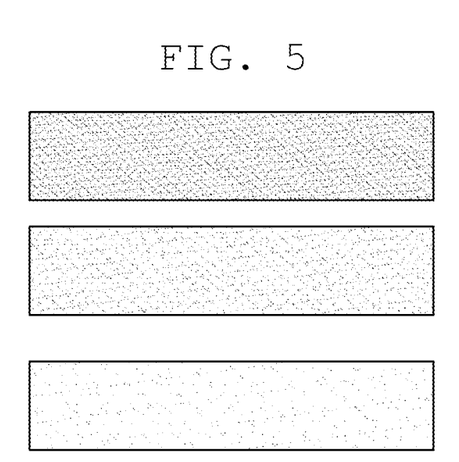
FIG. 5 is a view showing a color change of a color change layer according to the forms of the guide shown in FIGS. 3 and 4.
Figure 6:
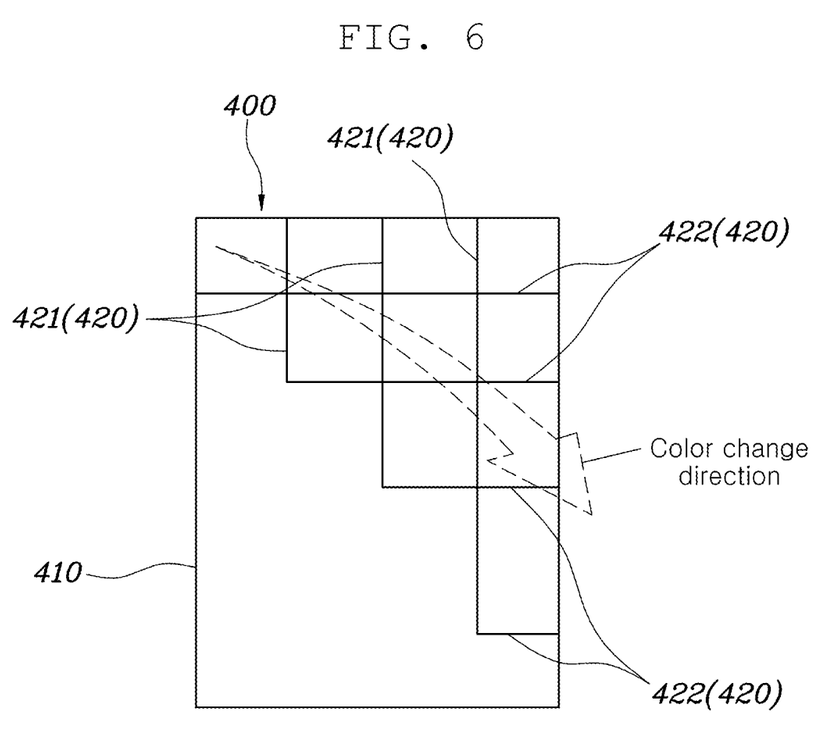
FIG. 6 is a view showing another form of the guide of the color-changeable plastic.
Figure 7:
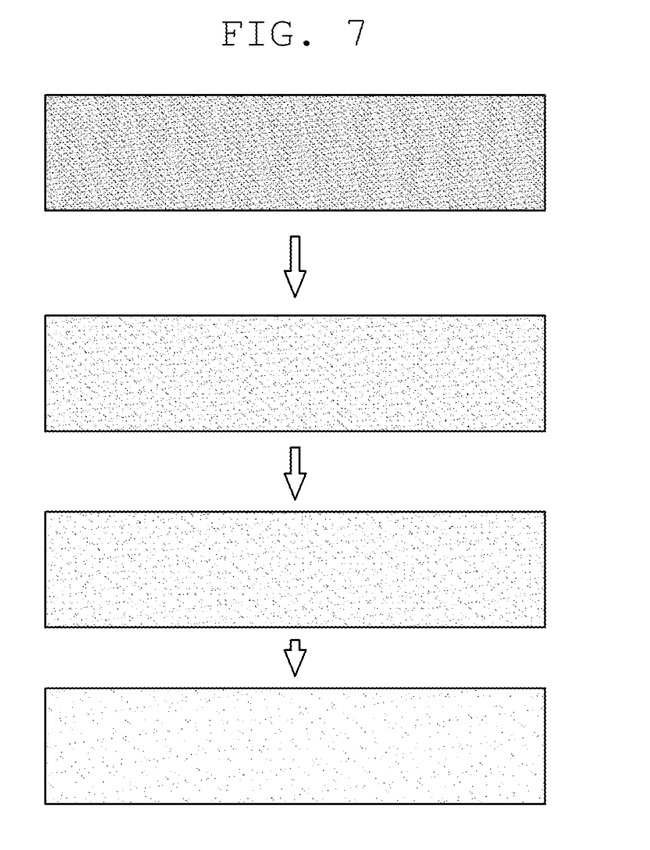
FIG. 7 is a view showing a color change of a color change layer according to the form of the guide shown in FIG. 6.
Figure 8:
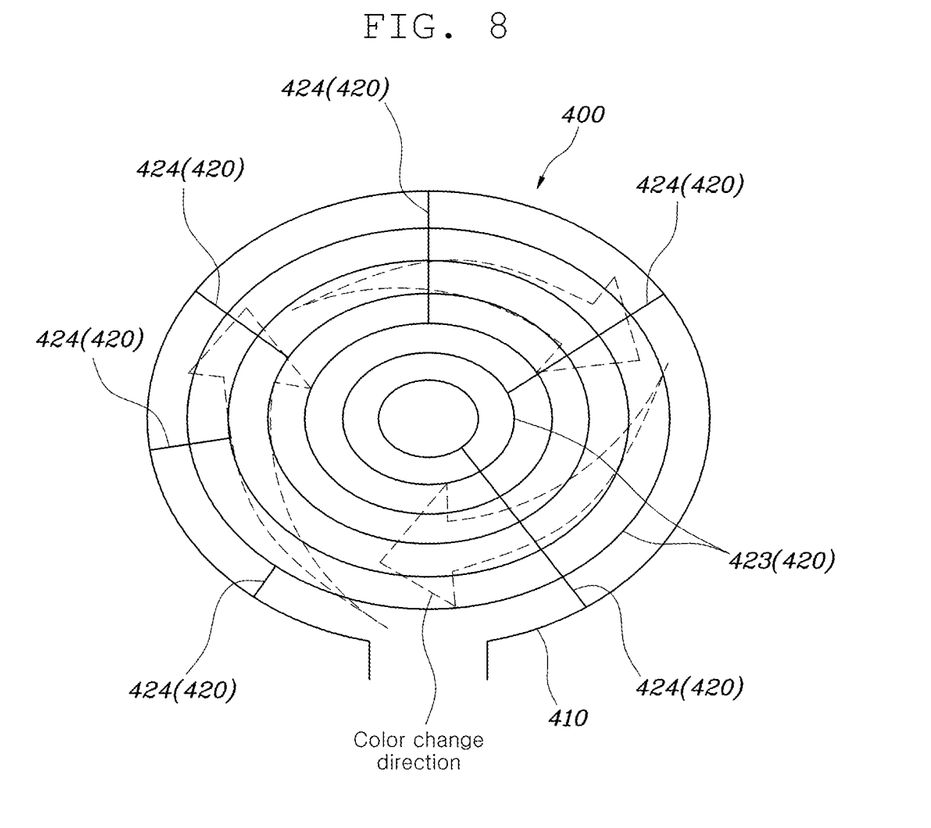
FIG. 8 is a view showing another form of the guide of the color-changeable plastic.
Figure 9:
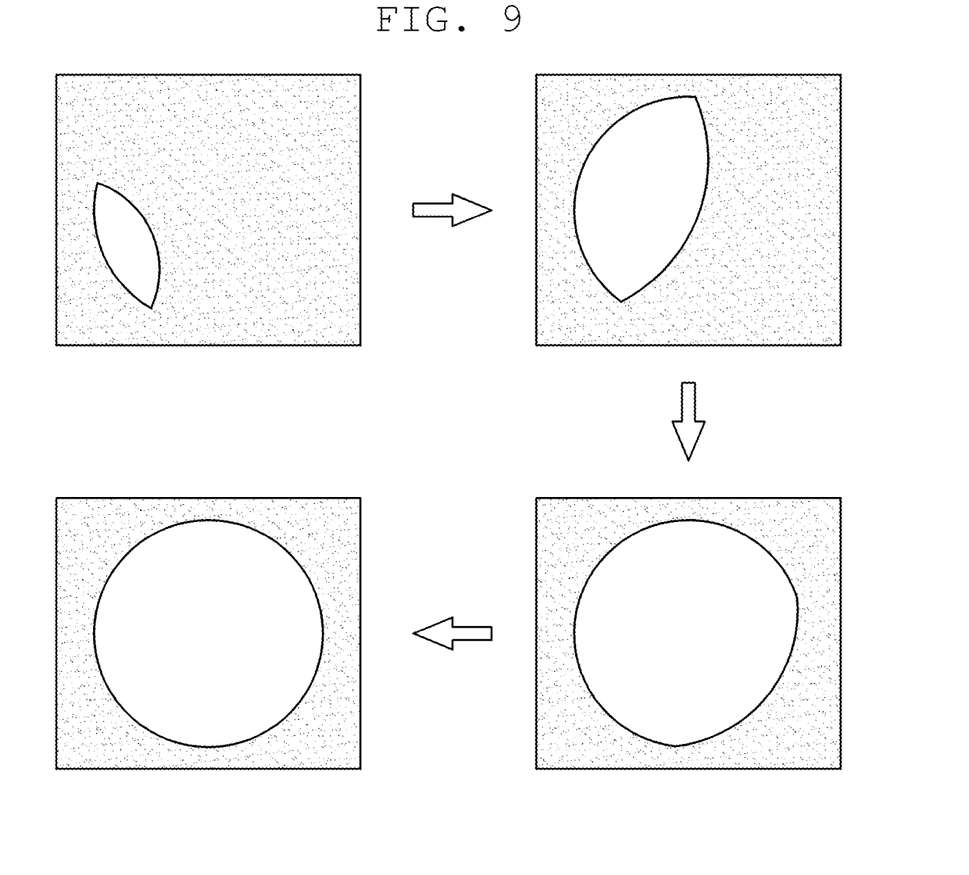
FIG. 9 is a view showing a color change of a color change layer according to the form of the guide shown in FIG. 8.

FIGS. 1 and 2 are views showing a color-changeable plastic according to the present disclosure, FIG. 3 is a view showing one form of a guide of the color-changeable plastic, FIG. 4 is a view showing another form of the guide of the color-changeable plastic, FIG. 5 is a view showing a color change of a color change layer according to the forms of the guide shown in FIGS. 3 and 4, FIG. 6 is a view showing another form of the guide of the color-changeable plastic, FIG. 7 is a view showing a color change of a color change layer according to the form of the guide shown in FIG. 6, FIG. 8 is a view showing another form of the guide of the color-changeable plastic, and FIG. 9 is a view showing a color change of a color change layer according to the form of the guide shown in FIG. 8.

A color-changeable plastic according to the present disclosure, as shown in FIGS. 1 and 2, includes: a first electrode layer 100 having conductivity; a color change layer 200 disposed on the first electrode layer 100 to cover the top surface of the first electrode layer 100 and made of a substance that changes color depending on whether a voltage is applied; a second electrode layer 300 having conductivity, disposed on the color change layer 200 to cover the top surface and side surfaces of the color change layer 200, and changing the color of the color change layer 200 in cooperation with the first electrode layer 100 when a voltage is applied; and an guide 400 having conductivity, disposed at the first electrode layer 100 and the second electrode layer 300, or at any one of the first electrode layer 100 and the second electrode layer 300, guiding a color change direction of the color change layer 200 by guiding movement of electrons when a voltage is applied.

The first electrode layer 100, the color change layer 200, and the second electrode layer 300 may be configured on a plastic substrate. That is, the first electrode layer 100, the color change layer 200, and the second electrode layer 300 may be deposited on a plastic substrate to change color on the plastic substrate. Accordingly, when this configuration is applied to a vehicle, it is possible to improve the quality of design and the commercial value by changing the color of the outer side of the vehicle. The first electrode layer 100, the color change layer 200, and the second electrode layer 300 according to the present disclosure can also be applied to substrates made of various materials other than a plastic substrate.

In particular, in the present disclosure, there is provided the guide 400 having conductivity, disposed at the first electrode layer 100 and the second electrode layer 300, or at any one of the first electrode layer 100 and the second electrode layer 300, and guiding the color change direction of the color change layer 200 by guiding movement of electrons when a voltage is applied. The guide 400 guides movement of electrons and enables smooth movement of the electrons. Accordingly, since the guide 400 guides movement of electrons when a voltage is applied to the first electrode layer 100 and the second electrode layer 300, the color of an electrochromic substance starts to change in the movement direction of the electrons, so the color change layer 200 changes color in a specific direction. Further, since the guide 400 enables smooth movement of electrons, the color change procedure of the electrochromic substance is accelerated by the electrons moving fast in the first electrode layer 100 and the second electrode layer 300, so the color change speed is improved.

In detail, according to the present disclosure, the first electrode layer 100 and the second electrode layer 300 are formed as transparent electrodes so that a color change of the color change layer 200 is shown to the outside. When a voltage is applied between the first electrode layer 100 and the second electrode layer 300, the conductivity of the color change layer 200 is controlled, whereby the color of the color change layer 200 changes.

In particular, the first electrode layer 100 and the second electrode layer 300 of the present disclosure have the guide 400 for quick reaction of the color change layer 200 when a voltage is applied. That is, the color change layer 200 is disposed on the first electrode layer 100 to cover the top surface of the first electrode layer 100, the second electrode layer 300 is disposed on the color change layer 200 to cover the top surface of the color change layer 200, and the guide 400 is disposed at the first electrode layer 100 and/or the second electrode layer 300. Accordingly, when a voltage is applied through the first electrode layer 100 and the second electrode layer 300, movement of electrons is guided by the guide 400, the color change speed by the electrochromic substance of the color change layer 200 is improved by fast movement of electrons, and a color change in a specific direction can be determined.

As described above, since the color change speed of the color change layer 200 is improved by the guide 400 disposed at the first electrode layer 100 and/or the second electrode layer 300 when a voltage is applied, the commercial value is improved by a quick color change of the color design.

The first electrode layer 100, the color change layer 200, the second electrode layer 300, and the guide 400 according to the present disclosure are described hereafter.

The first electrode layer 100 and the second electrode layer 300 may be composites of a silver nanowire and a polystyrene sulfonate (PEDOT:PSS). Accordingly, the first electrode layer 100 and the second electrode layer 300 have transmissivity of 80% or more. Since the gap between silver nanowires is filled with a polystyrene sulfonate that is an organic conductive polymer, the first electrode layer 100 and the second electrode layer 300 are entirely uniform and the electrical conductivity thereof is improved.

Divinyl sulfone (DVS) may be added as a crosslink agent to the composites of the first electrode layer 100 and the second electrode layer 300. Since divinyl sulfone is added as a crosslink agent to the composites of a silver nanowire and a polystyrene sulfonate, the composites become independent conductive films by reaction of a polystyrene sulfonate and divinyl sulfone. Accordingly, in the first electrode layer 100 and the second electrode layer 300, stability is improved, conductivity is maintained, and mechanical properties are increased.

The color change layer 200 may be made of Octa-Hexyl Viologen Substituted Polyhedral Oligomeric Silsesquioxane (OHV-POSS). That is, the color change layer 200, which is an organic-inorganic hybrid substance made by combining POSS that is an inorganic substance and viologen that is an organic substance, may be obtained by combining one to eight monohexyl-viologens, which are electrochromic substances, with a reactive functional group. Octa-Hexyl Viologen Substituted Polyhedral Oligomeric Silsesquioxane (OHV-POSS) produced through this process takes a short time to change color, can be driven at a low voltage, and can clearly provide a desired color.

The guide 400 may be a silver (Ag) lattice having a narrow linewidth. That is, a conducive ink containing a silver component may be used for the guide 400 and the guide 400 may be formed at the first electrode layer 100 and the second electrode layer 300 by continuously applying micro-droplets. The lattice of the guide 400 formed at the first electrode layer 100 and the second electrode layer 300 in this way may have a narrow linewidth of 15~300 μm and surface resistance of about 0.03Ω. Accordingly, the guide 400 makes movement of electrons and movement of ions smooth such that the color change performance of the color change layer 200 is improved in the areas of the first electrode layer 100 and the second electrode layer 300.

Since the guide 400 according to the present disclosure provides various patterns, the color change direction or the color change speed of the color change layer 200 are varied.

In detail, the guide 400 may have an edge portion 410 surrounding the edges of the first electrode layer 100 or the second electrode layer 300, and a guide pattern portion 420 having a pattern inside the edge portion 410, thereby guiding the color change direction of the color change layer 200. That is, the guide 400 is composed of the edge portion 410 forming the edge and the guide pattern portion 420 forming a pattern inside the edge portion 410. The guide 400 guides the color change direction of the color change layer 200 in accordance with the positions of the edge portion 410 and the guide pattern portion 420 and the color change speed of the color change layer 200 may be improved in accordance with the degree of density of the guide pattern portion 420.

In one form, as shown in FIG. 3, the guide pattern portion 420 may extend to straightly cross the inside of the edge portion 410. Accordingly, when a voltage is applied to the first electrode layer 100 and the second electrode layer 300, the color change direction of the color change layer 200 is determined by the edge portion 410 and the guide pattern portion 420 of the guide 400. The direction in which a voltage is applied to the first electrode layer 100 and the second electrode layer 300 may be the left side in the figures.

As shown in FIG. 4, a plurality of guide pattern portions 420 may be provided and spaced apart from each other. Since a plurality of guide pattern portions 420 is provided and spaced apart from each other, the color change direction of the color change layer 200 is guided when a voltage is applied to the first electrode layer 100 and the second electrode layer 300. In particular, since a plurality of guide pattern portions 420 is provided inside the edge portion 410 and the degree of density is increased with formation of a pattern, electrons move more actively and the color change speed is improved.

As described above, as shown in FIGS. 3 and 4, when the guide pattern portion 420 is disposed to straightly cross the inside of the edge portion 410, the color of the color change layer 200 can be changed from a side to the other side. That is, as shown in FIG. 5, the color of the color change layer 200 can be uniformly changed from a side to the other side by movement of electrons guided by the guide 400.

Meanwhile, as another form, the guide pattern portion 420 has a first guide line 421 crossing straight the inside of the edge portion 410 and a second guide line 422 crossing straight the inside of the edge portion 410 perpendicularly to the first guide line 421, whereby a lattice pattern can be formed. Since a lattice pattern is formed by the first guide line 421 and the second guide line 422 of the guide pattern portion 420, electrons move faster when a voltage is applied to the first electrode layer 100 and the second electrode layer 300, so the procedure of color change of the electrochromic substance of the color change layer 200 is accelerated, whereby the entire color change layer 200 can quickly change color. In particular, since the degree of density of the guide pattern portion 420 is further increased inside the edge portion 410, electrons move faster compared to to the shape of the guide pattern portion 420 shown in FIGS. 3 and 4, so the color change speed of the color change layer 200 is improved.

Meanwhile, as shown in FIG. 6, a plurality of first guide lines 421 is spaced apart from each other and gradually increased in length and second guide lines 422 extend to connect the first guide lines 421, respectively, whereby the guide patter portion 420 may be formed in a shape in which the lattice pattern gradually increases. As described above, since a lattice pattern is formed by the first guide lines 421 and the second guide lines 422 of the guide pattern portion 420 such that the lattice pattern gradually increases, the color of the color change layer 200 changes in the direction in which the lattice pattern increases when a voltage is applied to the first electrode layer 100 and the second electrode layer 300. Further, since the guide pattern portion 420 has a shape in which the lattice pattern gradually increases, the degree of density gradually increases, so the color change speed of the color change layer 200 can be varied and the color of the color change layer 200 can be smoothly and continuously changed.

Accordingly, as shown in FIG. 7, the color of the color change layer 200 can be changed from a side to the other side by movement of electrons guided by the guide 400 such that the color change gradually expands in the direction in which the lattice pattern increases.

Meanwhile, as shown in FIG. 8, the edge portion 410 is formed in a circular shape, and the guide pattern portion 420 may be composed of guide rings 423 radially arranged with predetermined intervals from the center of the edge portion 410, and connection lines 424 spaced apart from each other in the circumferential direction of the edge portion 410, extending toward the center of the edge portion 410, and connecting sequentially and gradually more guide rings 423 in the circumferential direction from the edge portion 410. As described above, the edge portion 410 is formed in a circular shape and the guide rings 423 of the guide pattern portion 420 are also formed in a circular shape in the same way as the edge portion 410 and are radially spaced apart from each other from the center of the edge portion 410. Further, the guide pattern portion 420 further has the connection lines 424 spaced apart from each other in the circumferential direction of the edge portion 410, extending toward the center from the edge portion 410, and connecting sequentially and gradually more guide rings 423 in the circumferential direction from the edge portion 410. Accordingly, when a voltage is applied to the first electrode layer 100 and the second electrode layer 300, movement of electrons is guided in the arrangement direction of the connection lines 424, so the color of the color change layer 200 can be circumferentially changed. That is, since the edge portion 410 and the guide rings 423 are spaced apart from each other in ring shapes and the connection lines 424 connect sequentially and gradually more guide rings 423 in the circumferential direction from the edge portion 410, the degree of density of the pattern circumferentially increases inside the edge portion 410. Accordingly, when a voltage is applied to the first electrode layer 100 and the second electrode layer 300, electrons are circumferentially guided from the center, whereby, as shown in FIG. 9, the color of the color change layer 200 can be circumferentially changed while the color change gradually expands.

According to the color-changeable plastic having the structure described above, the color change speed when a voltage is applied is improved, and the color change direction can be set.

Although the present disclosure was provided above in relation to specific forms shown in the drawings, it is apparent to those skilled in the art that the present disclosure may be changed and modified in various ways without departing from the scope of the present disclosure, which is described in the following claims.

What is claimed is:

1. A color-changeable plastic comprising:
   a first conductive electrode layer;
   a color change layer disposed on the first conductive electrode layer, configured to cover a top surface of the first conductive electrode layer, and made of a substance that changes color depending on whether a voltage is applied;
   a second conductive electrode layer disposed on the color change layer, configured to cover a top surface and side surfaces of the color change layer, and configured to change the color of the color change layer with the first conductive electrode layer when the voltage is applied; and
   a conductive guide disposed at at least one of the first conductive electrode layer or the second conductive electrode layer, and configured to guide a movement of electrons and a color change direction of the color change layer when the voltage is applied;
   wherein the conductive guide comprises:
      an edge portion surrounding edges of the first conductive electrode layer or the second conductive electrode layer; and
      a guide pattern portion including a pattern inside the edge portion and configured to guide a color change direction of the color change layer;
   wherein the guide pattern portion has first guide lines straightly crossing the inside of the edge portion and second guide lines straightly crossing the inside of the edge portion perpendicularly to the first guide lines, thereby forming a lattice pattern; and
   wherein a plurality of first guide lines is spaced apart from each other and gradually increased in length and the second guide lines extend to connect the first guide lines, respectively, whereby the guide pattern is formed in a shape in which the lattice pattern gradually increases.

2. The color-changeable plastic of claim 1, wherein the first conductive electrode layer and the second conductive electrode layer are composites of a silver nanowire and a polystyrene sulfonate.

3. The color-changeable plastic of claim 2, wherein the composites of the first conductive electrode layer and the second conductive electrode layer further include divinyl sulfone (DVS) as a crosslink agent.

4. The color-changeable plastic of claim 1, wherein the conductive guide is a silver (Ag) lattice having a linewidth of 15 μm to 300 μm.

5. The color-changeable plastic of claim 1, wherein the guide pattern portion straightly extends and crosses an inside of the edge portion.

6. The color-changeable plastic of claim 5, wherein the guide pattern portion includes a plurality of guide pattern portions, and each guide pattern portion of the plurality of the guide pattern portions is spaced apart from each other.

7. The color-changeable plastic of claim 1, wherein the guide pattern portion includes:
   a plurality of first guide lines, wherein each first guide line of the plurality of first guide lines are spaced apart from each other and gradually increase in length; and
   the second guide lines are configured to extend and connect each first guide line of the plurality of first guide lines.

8. The color changeable lastic of claim 1, comprising:
   wherein the edge portion is formed in a circular shape, and
   wherein the guide pattern portion includes:
      guide rings radially arranged at predetermined intervals from a center of the edge portion; and
      a plurality of connection lines connecting sequentially and gradually more guide rings in a circumferential direction from the edge portion,
      wherein each connection line of the plurality of connection lines is spaced apart from each other in the circumferential direction of the edge portion and extends toward the center of the edge portion.

* * * * *